US007349893B2

(12) United States Patent
McKeon

(10) Patent No.: US 7,349,893 B2
(45) Date of Patent: Mar. 25, 2008

(54) HIERARCHICAL USER INTERFACE QUERY AUTOMATION

(75) Inventor: Brendan McKeon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 721 days.

(21) Appl. No.: 10/837,412

(22) Filed: Apr. 29, 2004

(65) Prior Publication Data

US 2005/0246326 A1    Nov. 3, 2005

(51) Int. Cl.
G06F 17/30 (2006.01)
G06F 15/16 (2006.01)

(52) U.S. Cl. .................................. 707/3; 707/4; 707/5
(58) Field of Classification Search .................... 707/3, 707/4, 5
See application file for complete search history.

(56) References Cited

U.S. PATENT DOCUMENTS

2002/0124082 A1 *  9/2002  San Andres et al. ........ 709/225

OTHER PUBLICATIONS

Deborah Kurata, "Create Your Objects Right", *VBPJ magazine*, downloaded from http://www.fawcette.com/archives/premier/mgznarch/vbpj/1999/09sep99/pc0999.pdf, pp. 86-89, Sep. 1999.
Gunnar Schmidt, "GNOME Accessibility Architecture (ATK and AT-SPI)", downloaded from http://accessibility.kde.org/developer/atk.php, 7 pages, Apr. 29, 2004.

Benson et al., "GNOME Accessibility for Developers (CVS draft)", downloaded from http://developer.gnome.org/projects/gap/guide/gad/, 4 pages, Apr. 29, 2004.
"Examples that Use the Accessibility API", downloaded from http://developer.gnome.org/projects/gap/guide/gad/gad-api-examples.html, 8 pages, Apr. 29, 2004.
Dmitri Klementiev, "Software driving Software: Active Accessibility-Compliant Apps Give Programmers New Tools to Manipulate Software", online issue of *MSDN Magazine* (Apr. 2000), downloaded from http://msdn.microsoft.com/msdnmag/issues/0400/aaccess/default.aspx, 15 pages, visited Apr. 29, 2004.
"IAccessible::accNavigate", downloaded from http://msdn.microsoft.com/library/en-us/msaa/msaaccrf_3of9.asp?frame=true, 3 pages, visited Apr. 29, 2004.
Ed Ort, "What's New with Accessibility", online issue of Sun Microsystems' *The Source*, (Oct. 30, 2000) downloaded from http://java.sun.com/developer/technicalArticles/GUI/accessibility2/, 17 pages, visited Apr. 29, 2004.

(Continued)

*Primary Examiner*—Tony Mahmoudi
(74) *Attorney, Agent, or Firm*—Klarquist Sparkman, LLP

(57) ABSTRACT

A query can request user interface information from a user interface element hierarchy. Calls from a client program seeking user interface information related target user interface can be handled by a broker module. The broker module can operate across process boundaries and assemble efficient high-level user interface information queries to reduce the number of cross-process calls needed to collect the user interface information. Reducing the number of cross-process calls can result in better performance through improved speed of response to queries seeking user interface information across process boundaries.

23 Claims, 16 Drawing Sheets

OTHER PUBLICATIONS

Mark Andrews, "Accessibility and the Swing Set", online issue of Sun Microsystems' *The Source*, downloaded from http://java.sun.com/products/jfc/tsc/articles/accessibility/, 10 pages, visited Apr. 29, 2004.

Michael D. Meloan, "Articles: Zooming In On Accessibility", online issue of Sun Microsystems' *The Source* (Apr. 1999), http://java.sun.com/developer/technicalArticles/GUI/Accessibility/, 7 pages, visited Apr. 29, 2004.

* cited by examiner

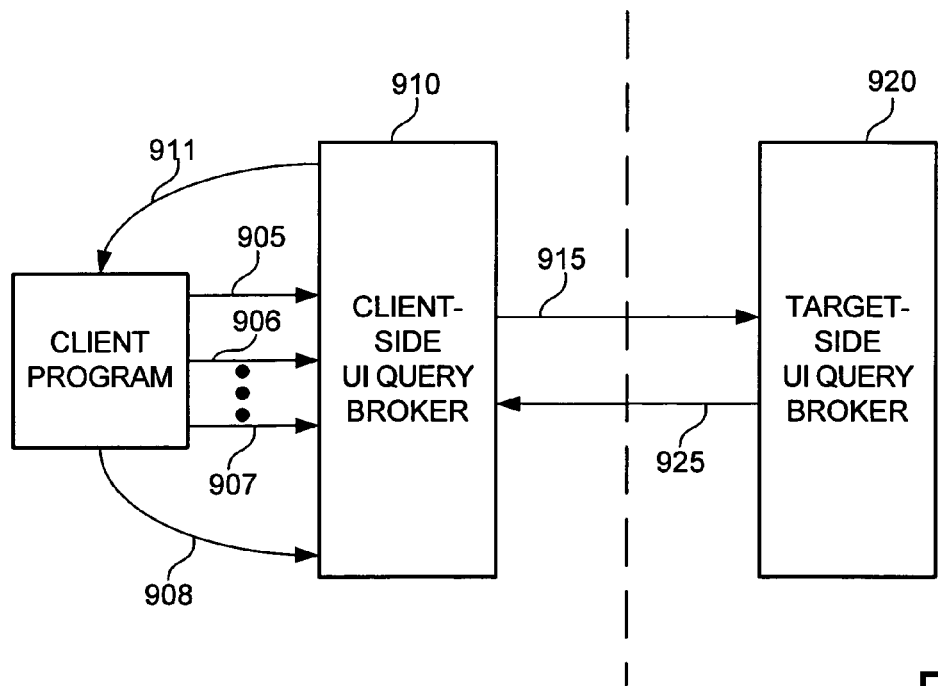

FIG. 9A

```
namespace System.Windows.Automation.Searcher
{
    class LogicalElementSearcher          930
    {
        int MaximumDepth { get; set; }     932
        LogicalElement Root { get; set; }  931
        condition condition { get; set; }  933
    }
}
```

FIG. 9B

```
LogicalElement appRoot = ...; // Root node of some application

ElementSearcher searcher = new ElementSearcher();    940
searcher.Root = appRoot;   941
searcher.Condition = new PropertyCondition(
LogicalElement.NameProperty, "Ok" );

LogicalElement result = searcher.FindFirst();   942
```

FIG. 9C

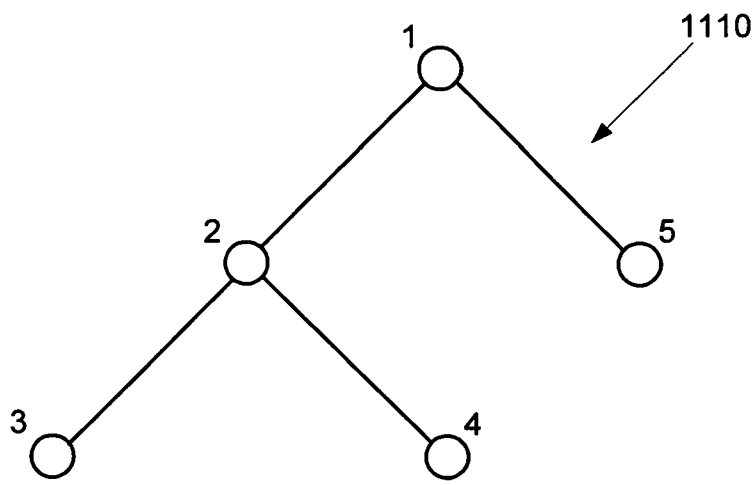
FIG. 11A
| | A | B | C |
|---|---|---|---|
| 1 | $X_1$ | $Y_1$ | $Z_1$ |
| 2 | $X_2$ | $Y_2$ | $Z_2$ |
| 3 | $X_3$ | $Y_3$ | $Z_3$ |
| 4 | $X_4$ | $Y_4$ | $Z_4$ |
| 5 | $X_5$ | $Y_5$ | $Z_5$ |
FIG. 11B
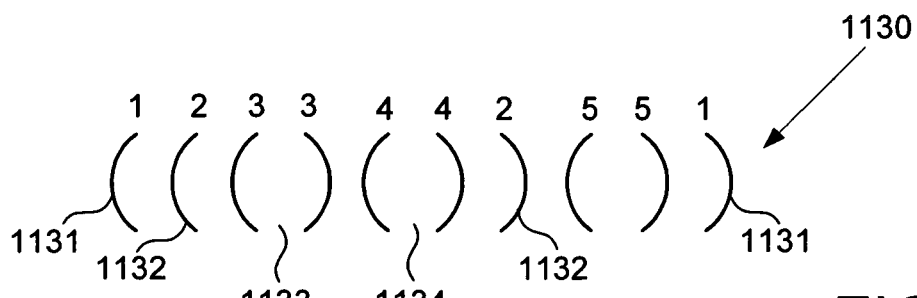
FIG. 11C

```
searcher.Requests.AddPropertyRequest( LogicalElement.NameProperty );          1210
searcher.Requests.AddPropertyRequest( LogicalElement.ControlTypeProperty );
searcher.Requests.AddPatternRequest( InvokePattern.Pattern );

NodeDataCollection ndc = searcher.QueryForData();    1220

// Go through the properties for each item...
foreach( NodeData node in ndc )         1230
{
    string name = node.GetPropertyValue( LogicalElement.NameProperty ) as string;
    string name1 = node[ 0 ] as string; // same as above because Name was the 1st request InvokePattern invoke = (InvokePattern ) node.GetPattern( InvokePattern.Pattern );

// This will throw an InvalidOperation exception, because we did not ask for
    // LogicalElement above - should have used AddLogicalElementRequest() to ask for it.
    LogicalElement le = node.LogicalElement;
    ...
}
```

FIG. 12

```
TreeStructureNode node = searcher.QueryForTree();  ~1310
                 ~1320
if( node != null )
{
   ProcessStructure( node );
} void ProcessNode( TreeStructureNode node )
{
   // Process this node...
   if( node.NodeData != null )
   {
       LogicalElement el = node.NodeData.LogicalElement;
       string name = node.NodeData.GetPropertyValue( LogicalElement.NameProperty ) as string;
       ...
   }

// Process children...
   for( TreeStructureNode child = node.FirstChild ;
       child != null ;
       child = child.NextSibling )
   {
       ProcessNode( child );
   }
}
```

FIG. 13

HIERARCHICAL USER INTERFACE QUERY AUTOMATION

TECHNICAL FIELD

The technical field relates to graphical user interfaces of a computer program. More particularly, the field relates to methods and systems for programmatically interacting with elements of a graphical user interface.

BACKGROUND

A typical mechanism for implementing user interaction with a computer may involve the use of a graphical user interface (GUI) associated with a computer program running on the computer. Generally speaking, user interface elements (hereafter, UI elements) are aspects of a computer system or program which may be seen (or heard or otherwise perceived or interacted with) by an end user and used to control the operation of a computer system or program through commands and other mechanisms. A GUI emphasizes the use of graphical UI elements which are responsive to user input (e.g., mouse events, keyboard data entry etc.) for interacting with a computer system or program. Common UI elements familiar to most users include buttons (e.g., "OK" or "Cancel"), edit boxes, list boxes, combo boxes, scroll bars, pick lists, pushbuttons, radio buttons components of World Wide Web pages (e.g., hyper-links, documents and images) and the like.

In addition to users directly interacting with UI elements of a program, other computer programs may need to the same. Thus, one program may import, use, search for or otherwise interact with the UI elements of another program. For instance, a test program may use programmatic access to UI elements of another program that it is testing. In such cases, the test program's script may find a UI element in a target program and repeatedly exercise the element to discover any errors.

Some users with special needs (e.g., vision impaired, hearing impaired etc.) may not be able to interact with UI elements of a program in the same manner as those without such special needs. For instance, a visually impaired user may not be able to see the elements of a list box to make a choice from among its list items. There are programs that are specially adapted to assist such users. Such assistive technology programs may use programmatic access to the list box UI element to determine its individual list items and then use a special narrator utility to enable the user to vocally interact with the program. Magnifiers, screen readers and tactile mice are but some examples of such assistive technology.

There are numerous other reasons for one program to interact with UI elements of another program. The interactions may include one program attempting to find a particular UI element of interest in another program it is testing as may be the case in a test program scenario. Also, as in the assistive technology scenario, one program may also want knowledge of the structure or relationship information about various elements of another program's GUI. Besides a structure, one program may also want knowledge of properties (e.g., visual, functional etc.) of the various UI elements of another program.

Regardless of the type of interaction, for one program to interact with the UI elements of another, a programmatic representation of such elements may be needed. FIG. 1 comprises a hierarchy 100 that graphically illustrates a programmatic representation of a typical GUI. More particularly, FIG. 1 illustrates how elements of a GUI can be shown as nested within each other in order to representatively describe their behavior (e.g., visual or functional). The very top of the tree form hierarchy 100 may be a desktop element 101 that is representative of a computer's desktop. The desktop element 101 may have represented within it several application program elements (e.g., 105A and 105B). A typical Microsoft® Windows desktop may have several instances of applications such as Microsoft® WordPad (105A), Microsoft® Excel® and other applications (105B). At a lower level in the hierarchy 100 may be several frames (e.g., 110A, 110B, 110C, 110D, and 110E) that may be associated with application programs (e.g., 105A and 105B). For instance, a word processing application may have several frames for interacting with a user.

Each of the frames (e.g., 110A "toolbar") may comprise of several component elements (e.g., 115A, 115B, and 115C representing list boxes, combo boxes, drop down menus, etc.). These UI elements may themselves comprise other UI elements. For example, a dialog box, or a combo box in turn may contain other control UI elements such as a button control and such nesting can go on much further depending on the UI and its component elements. Furthermore, each of the various elements in a single hierarchy may be implemented using different UI frameworks (e.g., Microsoft® Windows 32, Microsoft® HTML, etc.)

Individual UI elements or programmatic composites thereof implemented as objects may comprise interfaces through which their methods and properties are made accessible to other programs or objects thereof. FIG. 2 illustrates one method of implementing a collection of such interfaces wherein a client program 210 such as a test program or an assistive technology program uses a collection of interfaces (e.g., 215 A-B and 220 A-B) to programmatically interact with an individual UI element directly.

Typically, a client program 210 resides in one process 205 (e.g., a single virtual memory map) whereas the UI elements that are targeted (e.g., 205A and 210A) reside in another process (e.g., 225). Calls from a client process to another process for manipulating, finding, using, requesting information from and otherwise interacting with UI elements across a process boundary may be slower and consume considerably more computing resources than calls made within the process. For instance, in a multi-threading system such a cross-process call may require a greater number of system operations as a result of changing the memory map and coordinating between threads. Unfortunately, the existing Application Programming Interfaces (API) (e.g., Microsoft® Active Accessibility, MSAA hereinafter) used by accessibility aid applications require these costly cross-process calls when interacting with individual UI elements of a target UI hierarchy.

SUMMARY

Described herein are methods and systems for brokering calls from one program seeking UI information related to another program. In one aspect, calls from client programs requesting UI information from a target UI hierarchy are brokered by a UI query broker. In this manner, a client program may avoid having to traverse the target UI hierarchy making low-levels calls seeking UI information directly to individual elements of the target UI hierarchy. Instead, a client program may make calls seeking UI information at a more macro level and leave the burdensome task of assembling the UI information via low-level calls to individual elements of the hierarchy to a query broker.

In another aspect, queries from a client program that may result in visitation of a plurality of elements of a target UI hierarchy are brokered by a client-side and target-side query broker pair. In the case that a client program and its intended target UI hierarchy reside in different processes, a client-side query broker assembles an efficient cross-process query requesting UI information from a corresponding target-side query broker. The same is possible for an intra-process query between a client program and a target UI hierarchy. In response, the target-side query broker issues one or more calls to target UI elements of interest to collect their respective UI information. The collected UI information may then be processed and returned as results of the UI query.

In another aspect, the calls from the target-side query broker made directly to target UI elements of interest are intra-process calls.

In yet another aspect, a target-side query broker may invoke and issue cross-process calls to other target-side query brokers. For instance, it is possible that a single target UI element hierarchy of interest comprises individual UI elements associated with different processes. In this circumstance, further instances of target-side UI query brokers may be invoked to collect information from individual UI elements of interest in a process local manner as process boundaries are encountered while walking the tree structure representation of the target UI hierarchy.

In yet another aspect, queries seeking UI information may be defined using parameters that include a root element of the target UI hierarchy at which to begin collecting UI information of interest, data describing a scope or segment of the target UI hierarchy within which to collect the UI information, a set of conditions for determining the UI elements whose UI information is to be returned in the results, or some combination thereof. The data returned as results of the query may include a data structure comprising values of properties of UI elements of interest, and one or more data structures descriptive of hierarchical relationships among the various UI elements of the target UI hierarchy of interest.

Additional features and advantages will be made apparent from the following detailed description of illustrated embodiments, which proceeds with reference to accompanying drawings.

BRIEF DESCRIPTION OF DRAWINGS

FIG. 9A is a block diagram illustrating an exemplary system for brokering user interface information queries across process boundaries, wherein an efficient cross-process call requesting user interface information is first assembled based on multiple calls from a client program to a client-side broker providing parameters for the cross-process call.

FIG. 9B is an exemplary program listing of a definition of a class for query objects including parameters for defining the scope of the query.

FIG. 9C is an exemplary program listing of programmatic calls from a client program to a client-side broker providing the parameters that may be needed for assembling an efficient call requesting user interface information from a target UI hierarchy.

FIG. 1A is an exemplary target user interface hierarchy that may be the subject of a query requesting user interface information therefrom.

FIG. 11B is an exemplary array form data structure for collecting and storing user interface information including property information of various elements of a user interface hierarchy, such as the one shown in FIG. 11A.

FIG. 11C is an exemplary string form representation of the hierarchical relationships between the various elements of the exemplary user interface hierarchy of FIG. 1A.

FIG. 12 is an exemplary program listing of programmatic calls from a client program to a client-side query broker requesting properties of target user interface elements and specifying an array form data structure for storing values of the requested properties.

FIG. 13 is an exemplary program listing of programmatic calls from a client program to a client-side query broker requesting tree structure hierarchical information of a target user interface hierarchy.

DETAILED DESCRIPTION

An Exemplary Overall System for Brokering User Interface Queries

Figure 3:
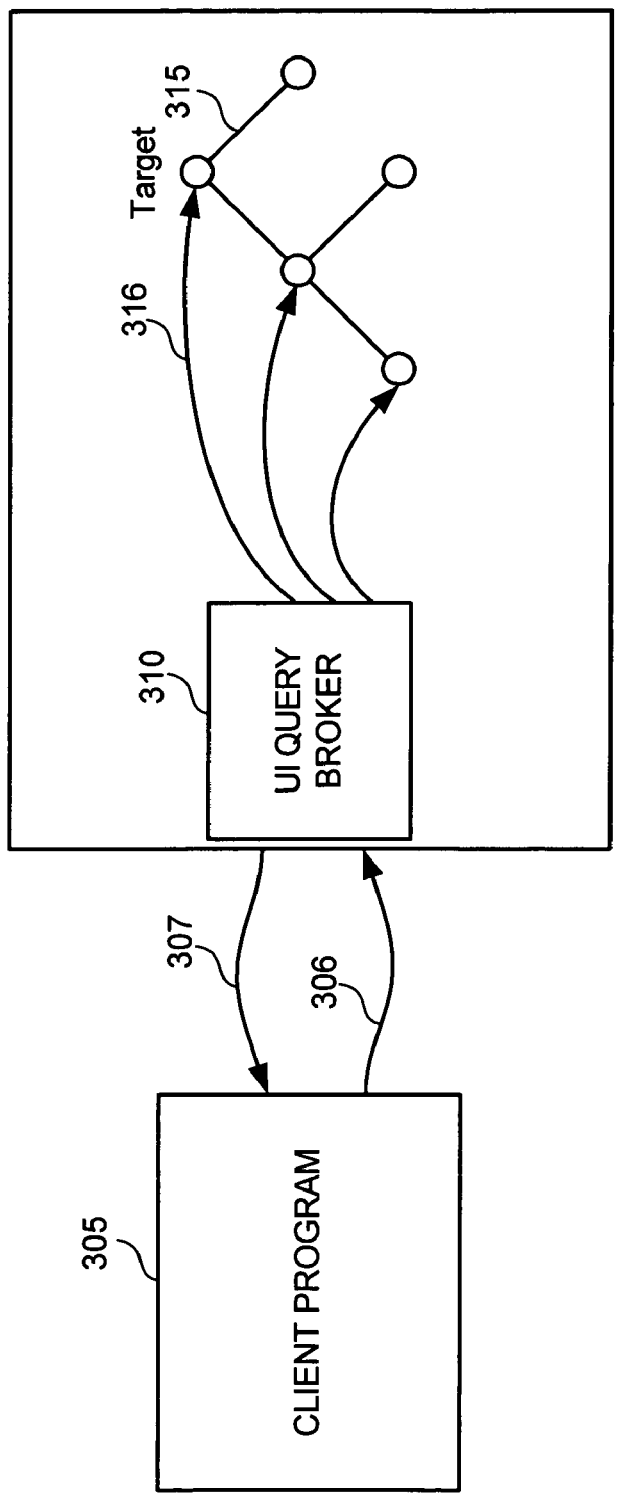
FIG. 3 is a block diagram illustrating an overall system for brokering queries seeking user interface information from a target user interface hierarchy.

FIG. 3 illustrates an exemplary UI element accessibility system for brokering queries requesting UI information between a client program 305 seeking such information and a UI hierarchy 315 that is a target of the queries. In this accessibility model, calls 306 from a client program 305 requesting UI related information from target UI elements 315 may be brokered by a UI query broker 310. Thus, the client program 305 may avoid traversing the target UI hierarchy 315 via making low level calls directly to each individual element of the target UI hierarchy by instead directing its UI related calls 306 to the UI query broker 310. Furthermore, the client program 305 may now make efficient higher level calls 306 seeking results 307 comprising UI information at a much more macro level than is associated with the low level calls (e.g., 316) related to traversing the target UI element hierarchy 315. The efficient calls 306 may be intra-process or across process boundaries depending on whether the client program and the target UI hierarchy are part of the same process.

An Exemplary Overall Method for Brokering User Interface Queries

Figure 4:
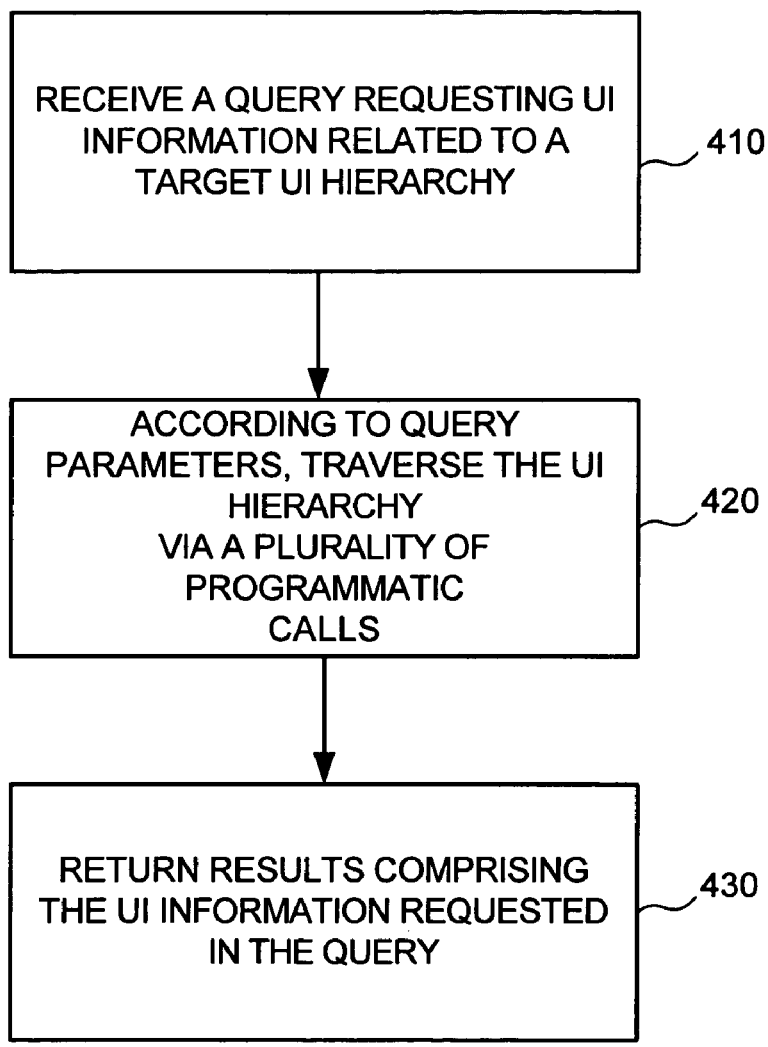
FIG. 4 is an exemplary overall method for brokering queries seeking user interface information from a target user interface hierarchy.

FIG. 4 describes an exemplary overall method for processing queries seeking UI information related to a target UI hierarchy. At 410, a query seeking UI related information from a target UI hierarchy is received. In response to the query, at 420, the target UI hierarchy can be traversed by visiting a plurality of elements of the target UI hierarchy, wherein the plurality of elements of the target UI hierarchy visited can be determined according to one or more parameters of the query. During traversal, UI information can be collected from the UI elements according to the query. Then at 430, results of the query comprising UI information sought in the query are returned.

Exemplary Types of Results to be Returned in Response to a Query

In any of the examples described herein, a query can specify one or more types of results to be returned. A query can specify a variety of result-types including but not limited to a reference (e.g., an UI element identifier) for identifying a first element of a target user interface hierarchy that meets one or more specified conditions, references for identifying all elements of a target user interface hierarchy that meet one or more specified conditions, selected properties of selected elements of the target user interface hierarchy or a representation of the hierarchical relationships (e.g., parent, child, sibling etc.) between the various elements of the user interface hierarchy. Also, a query may specify a combination of the result-types.

Figure 5:
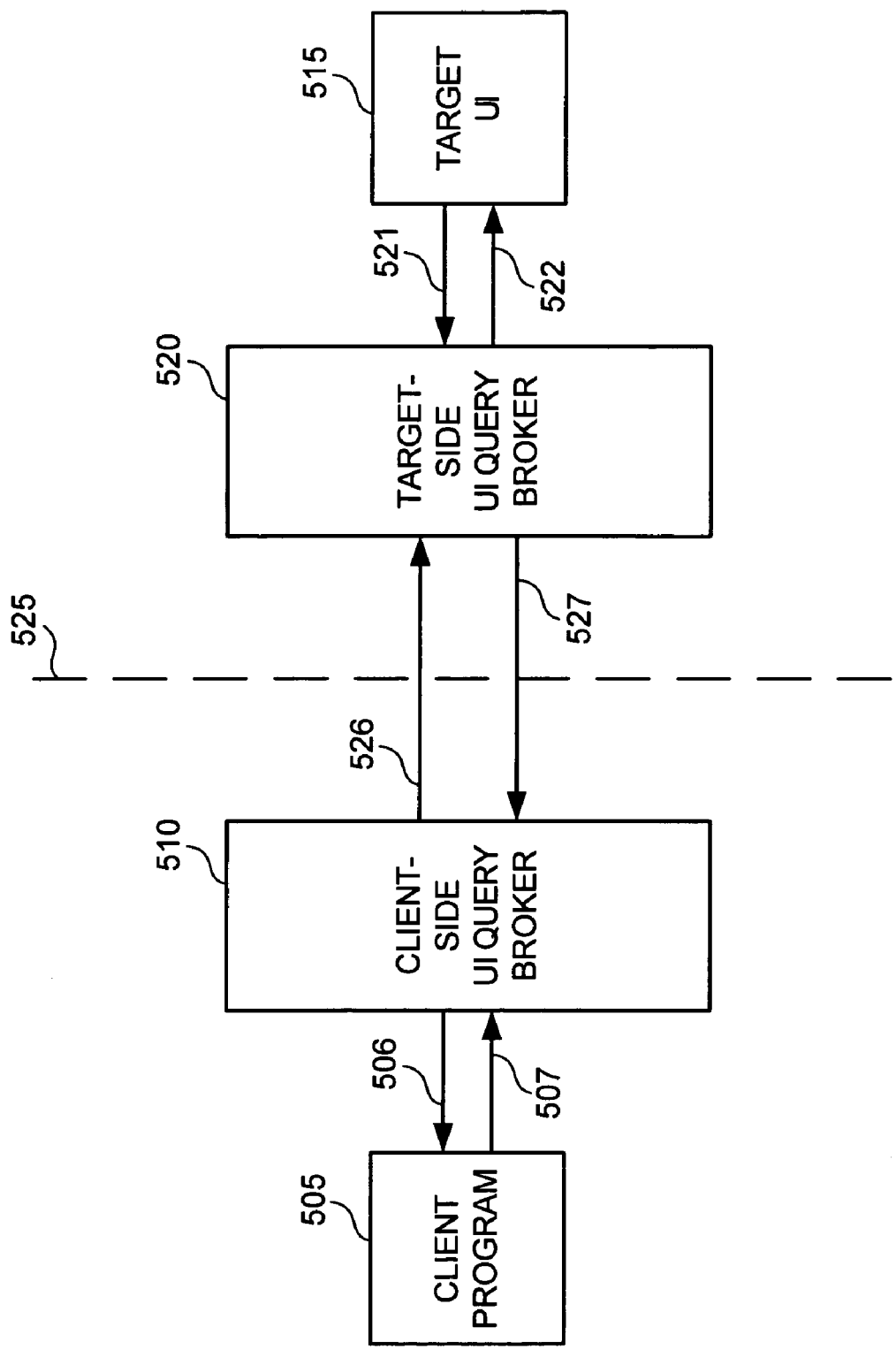
FIG. 5 is a block diagram illustrating the architecture of an exemplary system comprising client-side and target-side brokers for brokering queries from a client program requesting user interface information from a target.

An Exemplary Overall System for Brokering User Interface Queries Across Process Boundaries Using a Client-Side and Target-Side Broker Pair Low level calls seeking UI information from individual elements of the UI hierarchy across process boundaries may be particularly expensive. Also, not all client programs 305 themselves comprise the capability to assemble and make efficient cross-process calls seeking UI information from a target UI hierarchy 315 through a broker 310. Thus, as shown in FIG. 5 a client program 505 may make calls across process boundaries (e.g., 525) by directing its UI related calls 507 to a client-side query broker 510. In response to such calls from a client program 505, the client-side query broker 510 may assemble a cross-process UI query 526 directed to a corresponding target-side UI query broker 520 associated with the target UI 515. The target-side UI query broker 520 may then respond to the cross-process query 526 by directing one or more calls 522 seeking UI information directly to the target UI elements of interest 515. Results 521 from the calls 522 directed at the target UI elements 515 may then be assembled into data structures and returned across process boundary 525 as results 527 to the client-side UI query broker 510. The returned results 506 can then be made accessible to the client program 505.

This model for accessibility improves the speed at which requests from the client program 505 for UI information of target UI elements 515 are processed. By brokering UI related query calls from the client program 505, queries that may have required visitation or direct low-level calls to multiple individual target UI elements are assembled into higher-level calls 526 instead, thereby reducing the number of costly cross-process calls. Also, the task of traversing, visiting or making direct low-level calls to individual target UI elements for assembling or discovering UI information that is the subject of a UI related query is shifted from the client program 505 to the UI query broker pair 510 and 520.

Figure 6:
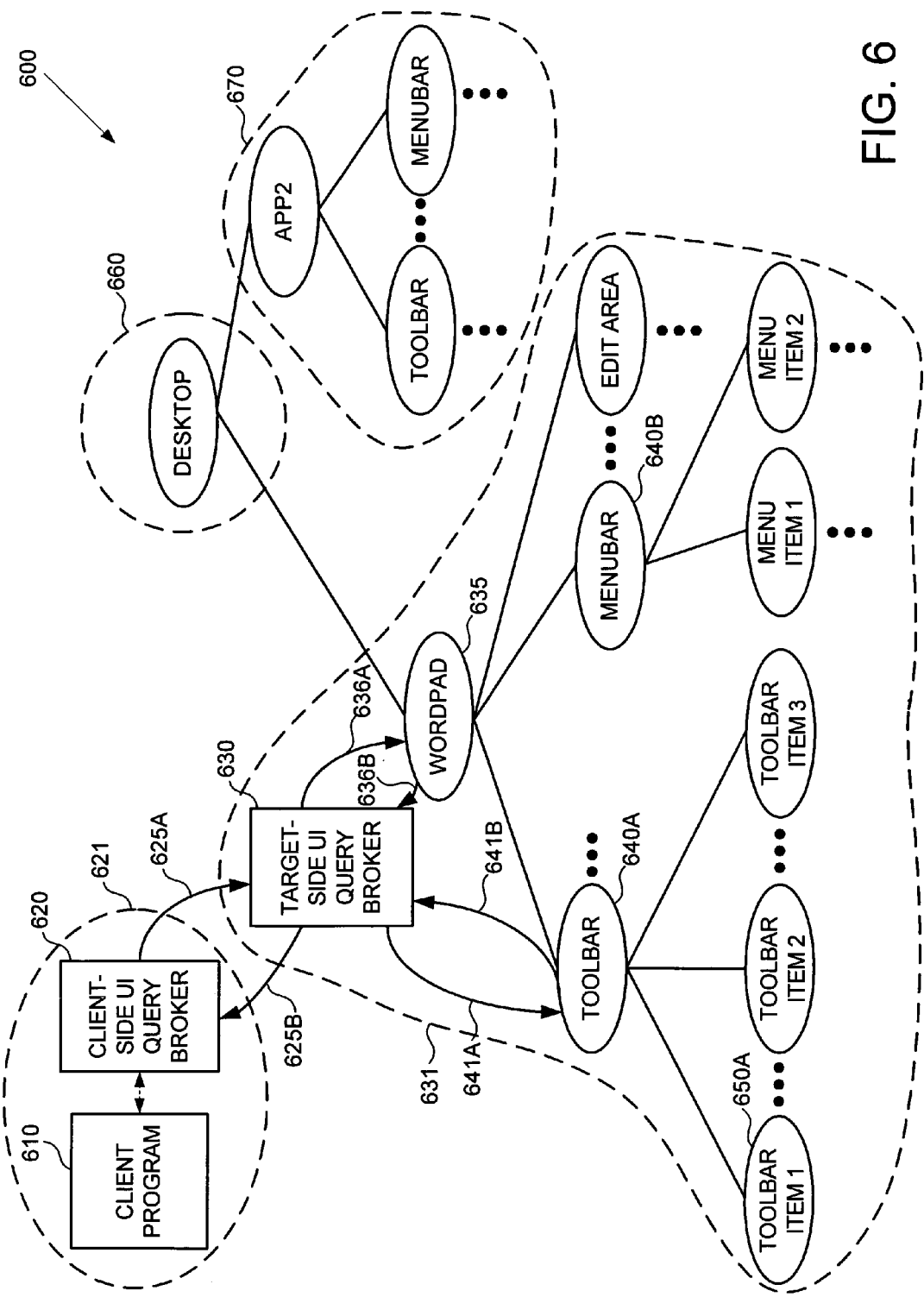
FIG. 6 is a block diagram illustrating one embodiment of the exemplary system of FIG. 5 for brokering queries requesting user interface information across one or more process boundaries comprising a client-side broker for assembling efficient cross-process queries and a target-side broker for responding to the cross-process queries by collecting and returning the requested user interface information as results.

FIG. 6 is a block diagram that illustrates one embodiment of the functioning of the system of FIG. 5 for brokering UI information queries. In contrast to the method illustrated in FIG. 2, calls from a client program 610 requesting UI information of target UI elements (e.g., visual properties of the UI elements 635, 640A and 640B) are first received by a client-side UI query broker 620 residing in the same process 621 as the client program 610. Based on the initial client program call, the client-side query broker 620 may then assemble a complex or high-level query call 625A across process boundaries to the target-side query broker 630 requesting it to collect the UI information sought in the query. The target-side UI query broker 630 may then use interfaces of individual UI elements (e.g., 635 and 640A) of the target UI hierarchy 600 to issue one or more calls (e.g., 641A and 636A) directly to the UI elements to collect the UI information sought (e.g., via the results 636B and 641B). Thus, a single call 625A across process boundaries can be used to request multiple types of UI information from multiple UI elements, and the results 625B may be returned once across the process boundaries (e.g., 631 and 621).

Returning to FIG. 5, the client-side UI query broker 510 may be implemented as a code module that can be invoked by the client program 505 and used for executing queries seeking UI information from across process boundaries. In one embodiment, the client-side UI query broker 510 may be implemented as a set of code modules comprising among other things a defined set of methods and functions that are dynamically linked at runtime to the client program 505 for execution. For instance, in a Microsoft® Windows operating system they may be implemented as Dynamically Linked Library (.DLL) files. Similarly, the target-side UI query broker 520 may also be implemented as a set of code modules that can be dynamically linked to programs comprising the target UI elements 515. Besides dynamic linking, other implementations are also possible. For instance, these code modules may be implemented as static library files. Other implementations of the UI query brokers 510 and 520 are also possible so that the client program 505 can make process local calls to client-side UI query broker 510 and similarly, the target-side broker 520 can make process local calls to the targeted UI elements 515.

Figure 7:
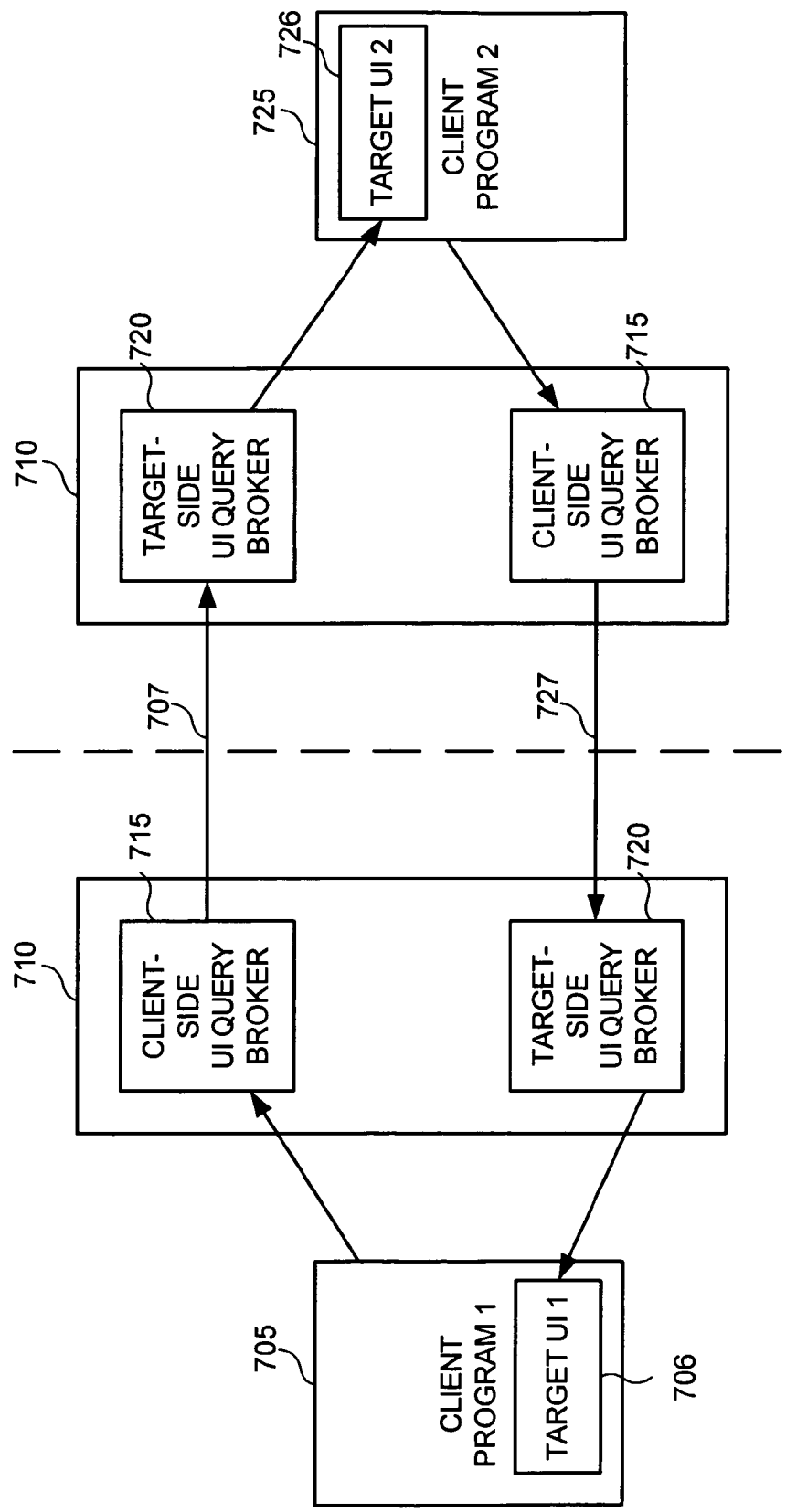
FIG. 7 is a block diagram illustrating an alternative implementation of a system for brokering queries from a client program requesting user interface information from a target, wherein a broker system component comprises both target-side and client-side brokering functionalities.

As described above with reference to FIG. 5, the UI query brokers 510 and 520 may be implemented as code modules that are loaded and executed separately. Alternatively, as shown in FIG. 7 a single code module 710 can comprise code related to both the client-side 715 and the target-side 720 query broker functionality. Thus, the client-side and target side functionality can be implemented together in one code module which may be invoked as one file or implemented such that they are invoked separately.

Also, as shown in FIG. 7, a client program 705 may itself comprise a target UI 706 that is the target of a UI related cross-process query 727 issued by another program 725. Similarly, a program 725 that comprises a target UI 726 that is the subject of a cross process UI query 707 can itself request other UI information from another program 705.

Figure 8:
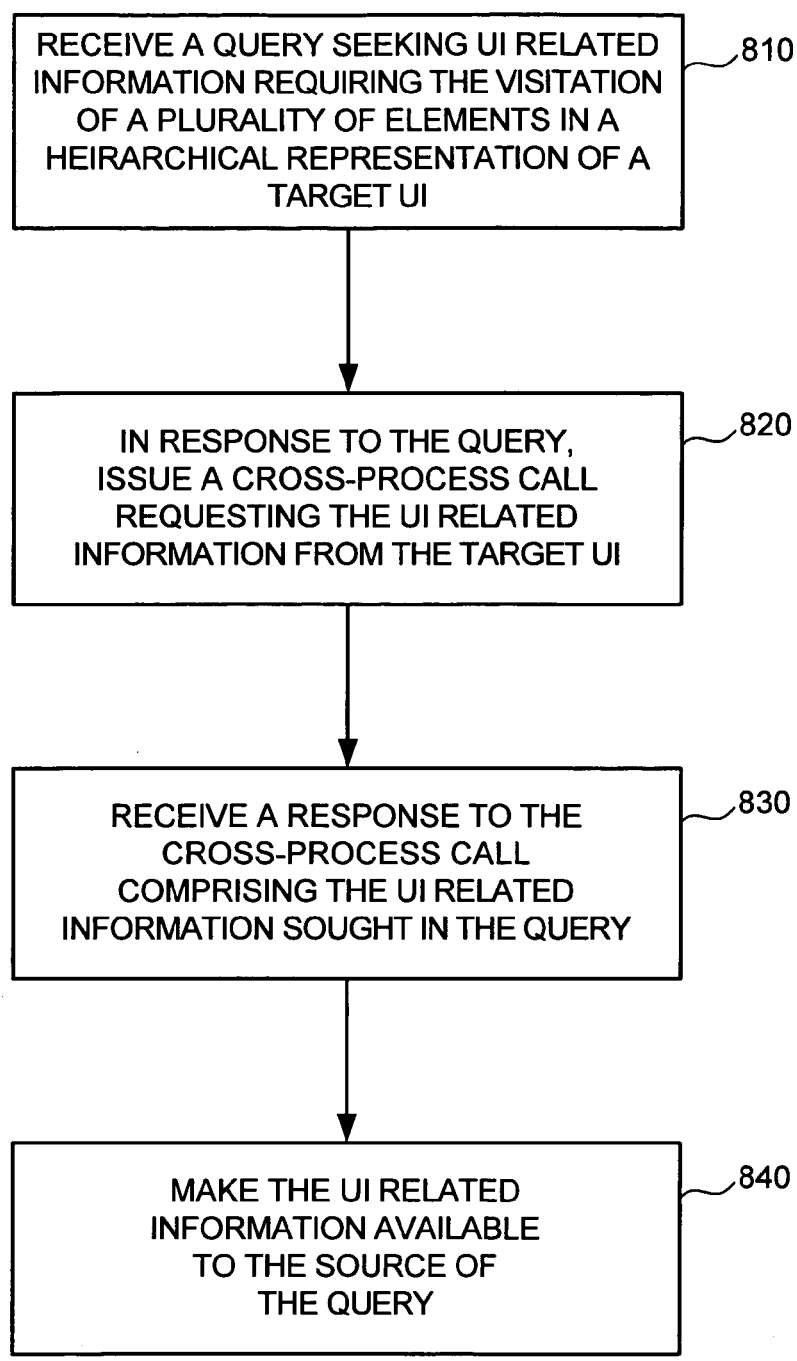
FIG. 8 is a flow diagram describing an overall method implemented by a client-side broker for processing queries from client programs requesting user interface information by assembling an efficient call and processing the returned results.

An Exemplary Method of Brokering UI Element Queries by a Client-Side UI Element Query Broker FIG. 8 shows an exemplary method implemented by a client-side UI element query broker 510 for brokering queries requesting UI information from target UI elements across process boundaries. At 810, a query from a client program seeking UI information related to one or more target UI elements in a process outside the client's process may be received. The query calls from the client program can be from within the same process as the client-side UI element query broker receiving the calls.

Next at 820, the client-side UI element query broker may respond to the intra-process calls by assembling and issuing a cross-process query call to a target-side UI element query broker requesting the UI information sought by the client program. As shown in FIG. 9A, the intra-process calls from a client program may be a collection of related calls (e.g., 905, 906 and 907) that together provide data including conditions and other query parameters for assembling the cross-process query call 915 directed at the target UI element query broker 920. Furthermore, other intra-process calls (e.g., 908) from a client program may specify a result-type indicating a type of query result (e.g., FindAll( ), FindFirst( ), etc.) expected.

Then at 830, results 925 of the cross-process query call 915 are returned to the calling client-side UI element query broker and made available to the client program at 840 (e.g., via the call 911). Alternatively, the intra-process query call from a client program to its associated client-side UI query broker (810) may be a single call with multiple parameters for assembling the cross-process call at 820.

Exemplary Programmatic Implementations of Intra-Process Calls from a Client Program Seeking UI Information FIGS. 9B and 9C are program listings showing exemplary implementations of the method of receiving intra-process calls from a client program, which is then assembled and issued as cross-process calls (e.g., the call 915) for retrieving UI related information. As shown in FIG. 9B, the query 930 is first established by creating a query object of the exemplary "LogicalElementSearcher" class. The query may specify a type of result (result-type) comprising UI information such as a reference for identifying the first element in a target UI element hierarchy that meets a particular condition (e.g., FindFirst), references for identifying all elements in a target UI element hierarchy that meet a particular condition (e.g., FindAll), selected properties of selected elements of the target UI element hierarchy, a representation of the hierarchical structure of the target UI hierarchy (e.g., the various parent, child sibling relationships of its component elements), or some combination thereof.

Several properties or parameters of the query may also be specified to further define the scope and nature of the query. In any of the examples, the query may specify a root element (931) in a target UI element hierarchy (e.g., 600) at which to begin collecting UI information requested in a cross-process query. Also, specifying a maximum depth (932) in the target hierarchy within which to conduct the query may further narrow the query. For instance, with reference to FIG. 6, a query may be specified to begin at the Wordpad element 635 and extend down to a specified level lower in the hierarchy (e.g., ToolBar Item 1 650A).

In the example, the query is implemented as traversing the target UI hierarchy in a depth-first fashion. However, depending on the particular implementation desired and the structure of the target UI, the hierarchy may be traversed in another way (e.g., breadth-first). In the event a breadth-first traversal of the UI element hierarchy is implemented, then instead of a maximum depth property a maximum width property may be specified. Also, a combination of maximum depth and width may be specified.

In addition to a maximum range or scope (e.g., by specifying a maximum depth, width or a combination thereof) and a starting root element for the query, in any of the examples herein, queries may require one or more conditions and these may be specified by setting the condition property 933 for a query object. For instance, a query may ask to find all elements within a specified range of the target UI element hierarchy (e.g., specified by a root element and a maximum depth) that have a specified set of properties. Also, a complex set of conditions may be specified by combining individual condition values with mathematical operators (e.g., "AND", "OR" etc.).

FIG. 9C shows a program listing implementing an example of such a query from the client program. The example query 940 of FIG. 9C is implemented as a collection of calls (e.g., intra-process) from the client program to its corresponding client-side UI element broker. The query 940 as shown in FIG. 9C requests that the query start at a root UI element ("appRoot" at 941) and look for elements that have their "NameProperty" set to a string value of "OK." In this example, the result the query expects (e.g., the result type) is of the "FindFirst( )" 942 variety. Thus, as illustrated in FIG. 9A, the query 940 of FIG. 9C is implemented by making a series of calls (e.g., 905-907) to set the parameters of the query and another call to specify a type of result expected by the query (e.g., 908). Similarly, other queries may be defined by combinations of other properties.

An Exemplary Method for Assembling a Cross-Process Call

Upon specification of the type of results expected in the query at 908 (e.g., 942), the client-side UI query broker 910 may use the query parameters (e.g., maximum depth 932, root element 931 and conditions 933) and the type of query result expected (e.g., FindFirst( ), FindAll( ), etc.) to assemble a cross-process query data structure with the query information and provide such a data structure to the target-side UI query broker 920 as part of the cross-process call 915. For instance, the data structure may be an array comprising a root element to begin the UI tree traversal, a maximum depth specification or some other data defining a range of the target UI tree hierarchy to be traversed, conditions of the query, if any, and an item code (e.g., 1, 2, etc. for identifying FindFirst( ), FindAll( ) etc.) for uniquely identifying the type of information to be retrieved as results (e.g., a result-type) of the query. The exemplary data structure may comprise one or more such item codes, thus identifying one or more types of results to be returned based on the same query parameters.

Figure 10:
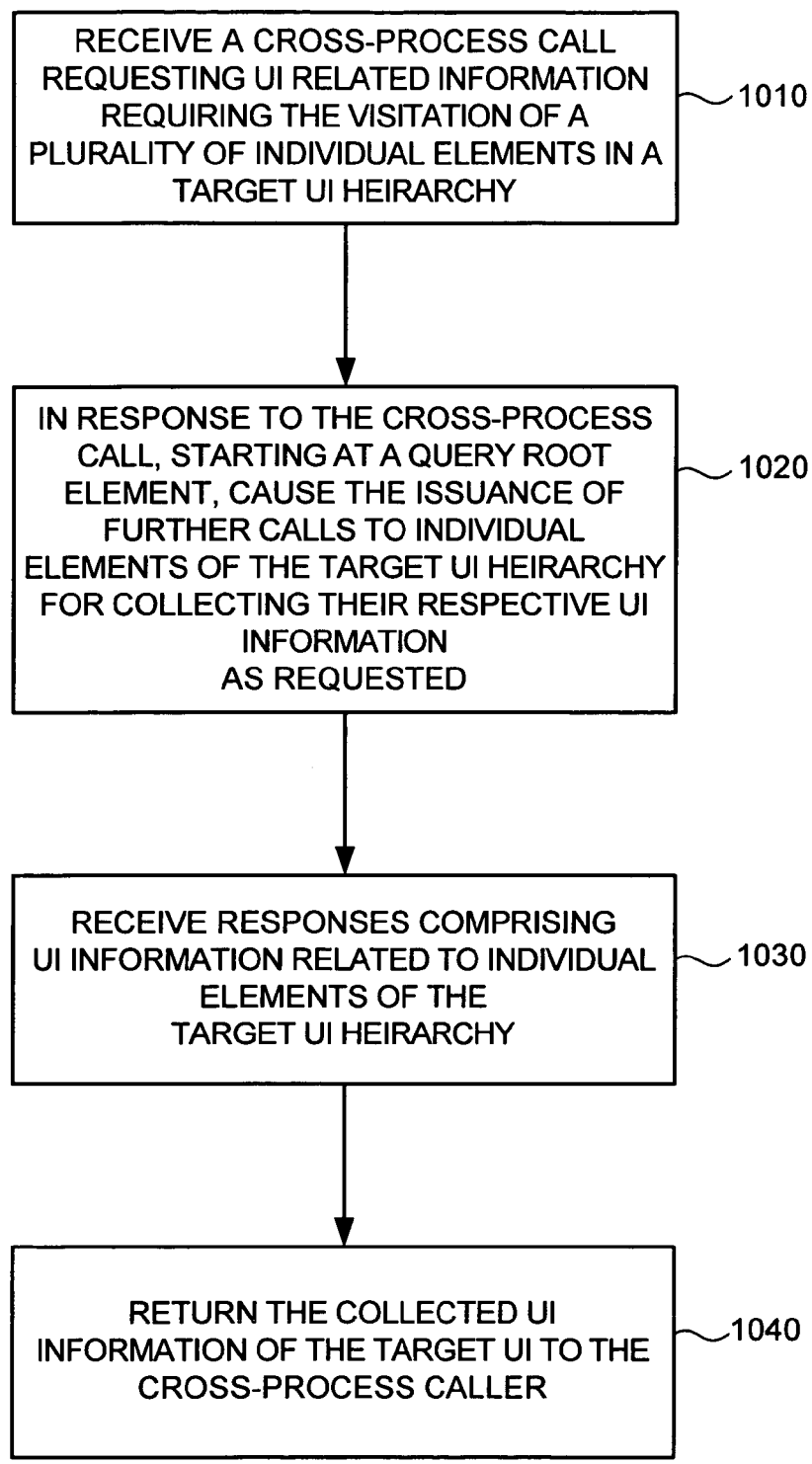
FIG. 10 is a flow diagram of an exemplary method implemented by a target-side broker for collecting user interface information requested in response to an efficient call from a client-side query broker, processing the collected user interface information and returning the processed information as results.

An Exemplary Method of Brokering UI Element Queries by a Target-Side UI query broker FIG. 10 illustrates a method implemented by a target-side UI query broker (e.g., 630) in response to receiving a cross-process call 625A. At 1010, the target-side UI element query broker 630 may receive a cross-process query requesting UI related information requiring the visitation of a plurality of individual UI elements of a target UI hierarchy. The cross-process call may comprise such query parameters such as a root element (e.g., 931) at which to begin traversing the target UI hierarchy, a maximum depth 932 down to which the traversal seeking UI information should range, conditions for collecting UI related information etc. In any of examples described herein, the call may also comprise an indicator for specifying the type of results to be returned (e.g., find the first element that meets a specified condition, find all elements that meet a set of conditions, return properties of selected UI elements, etc.). Thus, at 1020, in response to the cross-process call, the target-side UI query broker 630 begins traversing the tree by issuing one or more calls directly to the individual UI elements requesting their respective UI information. In this embodiment, these calls are addressed to UI elements residing in the same process as the target-side UI element query broker 630. However, as described further below, such calls may also be across process boundaries in those circumstances wherein a hierarchy of target UI elements spans across multiple processes.

Depending on a specified range of a target UI tree hierarchy to traverse, the target-side UI query broker 630 generates a plurality of calls to collect UI related information. At 1030, the UI element query broker 630 receives responses (e.g., 641B and 636B) to such calls comprising the requested UI information and at 1040 returns the collected responses to the client-side UI query broker 620. In this manner, multiple responses (e.g., 641B and 636B) from individual UI elements may be gathered, analyzed and assembled into one or more data structures to be returned as results (e.g., 625B) of the cross-process call from a client-side UI element query broker 620.

Exemplary Types of UI Information Returned as Results of a Cross-Process Query In any of the example described above, besides returning a reference (e.g., an UI element identifier) for identifying the first UI element that meets a set of conditions or references identifying all elements that meet certain conditions, other types of UI information may also be returned as results of the cross-process query. For instance, UI information such as selected properties of selected UI elements of a target UI hierarchy may be returned as results of a query. The requested properties may be specified, and only the properties of selected UI elements that meet a given set of conditions may be returned in results. Also, specified properties of all UI elements in a specified range of the target UI tree hierarchy may be requested and returned.

In addition to UI element properties, a tree structure description of a target UI hierarchy comprising the parent, child, sibling etc. relationships between the various elements of the UI hierarchy may also be returned in the results. A client program may then use the retrieved tree structure information to reconstitute a representation of the target UI hierarchy in a memory location local to its own process to traverse the reconstituted tree structure without having to make calls across process boundaries.

Exemplary Data Structures Returned as Results of the Cross-Process UI Query Calls FIG. 11A illustrates an exemplary UI element hierarchy 1110 with UI elements 1 through 5 arranged to represent parent, child and sibling relationships between elements of a user interface. As noted above, in any of the examples described herein, client programs (e.g., 505) may use queries to request UI information such as properties of individual UI elements and tree structure of a selected portion of a target UI hierarchy (e.g., 515). Thus, referring now to FIG. 11A, a client program may request information related to properties of individual UI elements 1 through 5 and request the tree structure information (e.g., parent, child, and sibling relationships between the UI elements 1 through 5). In any of the examples described herein, a variety of data structures can be used to return query results. For instance, UI information related to one or more elements of the UI element hierarchy can be returned according to the associated query.

FIG. 11B is an exemplary data structure for returning results in the form of an array 1120 of properties of the various UI elements (1 through 5) of the target UI element hierarchy 1110. The fields of the array 1120 comprise values (e.g., $X_1$, $Y_1$, etc.) of properties (e.g., A, B, C, etc.) for each of the component UI elements 1 through 5 of the hierarchy 1110. The properties may comprise any visual or functional property of the individual UI elements and may be expressed in form of any data types including simple types such as string, integer or even more complex user defined data types.

FIG. 11C illustrates one string type representation of the tree structure information of the exemplary target UI element hierarchy 1110. The parent, child, sibling information of hierarchy may be represented in string form 1130, which shows UI element '1' at 1131 as the principal and most superior parent (e.g., the root) of all other elements in the hierarchy 1110. The arrangement shows all other children elements (direct or indirect) nested within the parent 1131. Similarly, the parent child relationship between element '2' and its children '3' and '4' is expressed by nesting element 1133 and 1134 within 1132. This process may be extended to cover larger more complex tree structure information in a similar fashion.

The string description (e.g., 1130) of the tree structure and the array 1120 of properties of the exemplary target UI may be received or made accessible (e.g., 507) to a client program (e.g., 505) via the result 527 of the cross-process query call 526 shown in FIG. 5. Once such UI information is made available, the client program can then reconstitute the target UI hierarchy along with its properties and its tree structure in a memory location that is local to its own process. Then the client program may make calls to individual UI elements of the local copy of the hierarchy to obtain specific UI information as and when it is needed without having to make calls across process boundaries.

Figure 1:
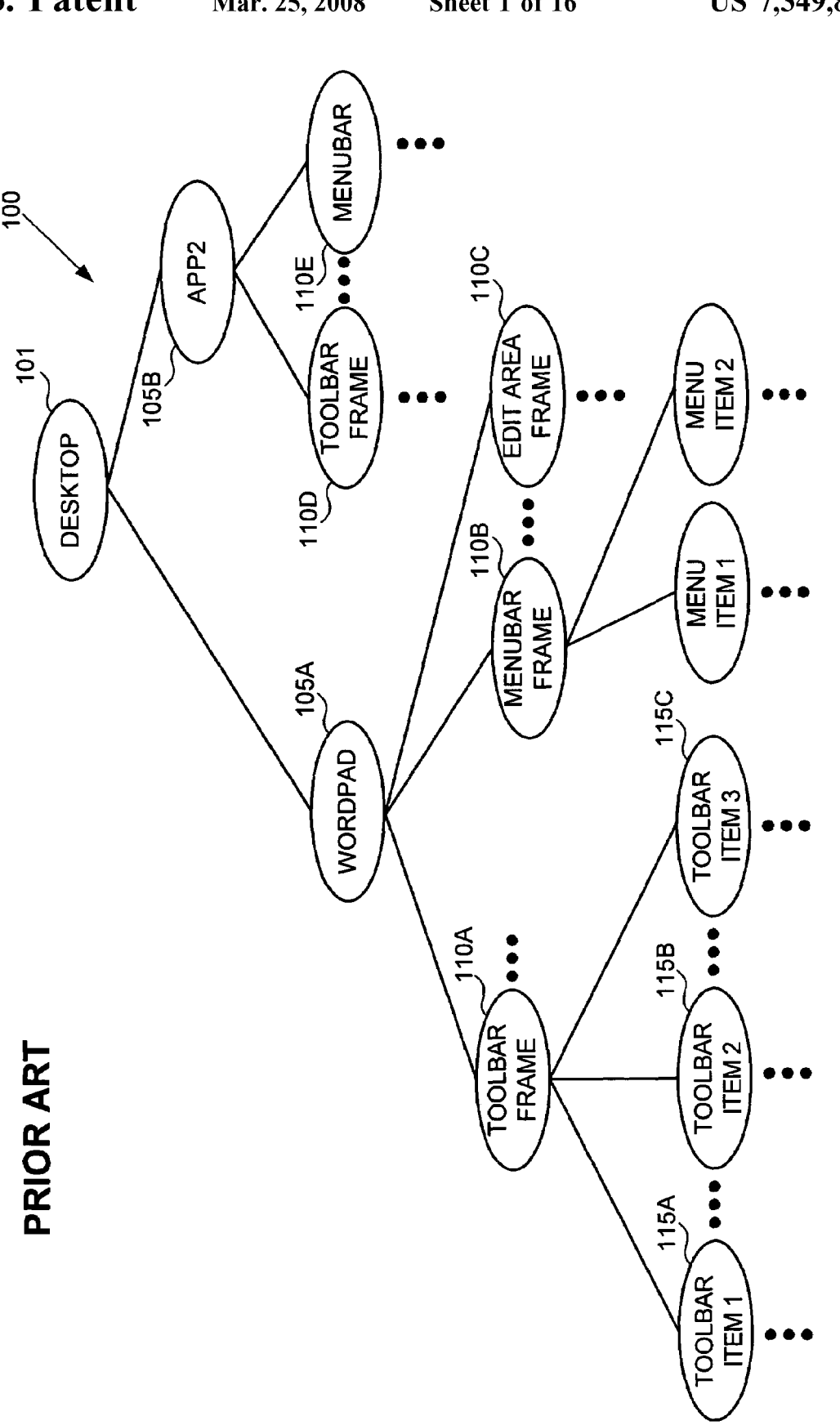
FIG. 1 is a block diagram illustrating an exemplary hierarchical representation of a graphical user interface with component user interface elements.

FIG. 12 is a program listing of an exemplary implementation of a method of requesting an array of UI element properties such as the one described with reference to FIG. 1B above. As shown at 1210, a client program may request multiple properties (e.g., NameProperty, ControlTypeProperty, etc.) of a target UI element hierarchy. At 1220, a data array (e.g., NodeDataCollection) may be generated for storing values of the requested properties for the appropriate component elements of the UI hierarchy.

Each field of the NodeDataCollection may be set to correspond to a value of a requested UI property. The client program can then, as shown at 1230, retrieve data values from the NodeDataCollection data array as and when it is needed. In one embodiment, such a data structure may be in a memory location accessible to both the client program (e.g., 505) and the target-side UI query broker (e.g., 515) which can write values into the appropriate fields of the data array as it collects property values of the target UI. In yet another embodiment, such a data structure may be assembled and a local copy may be provided to the client program's process so that calls from the client program requesting data from the fields of the data array may be intra-process calls.

FIG. 13 is a program listing of an exemplary implementation of a query by a client program (e.g., 505) requesting a tree structure representation of a target UI element hierarchy. The exemplary query at 1310 is titled "QueryForTree( )," which is then translated to a cross-process query from a client-side UI element query broker (e.g., 510). The data structure (e.g., "TreeStructureNode" at 1320) returned may be in the form as described with reference to FIG. 1C above. Once it is made available to the client program (e.g., 510), the client program may process the tree structure data structure appropriately to decipher the hierarchical relationships between the various elements of the target UI hierarchy. Such processing need not entail calls across process boundaries because a local copy of the tree data structure may be made available to the client program.

Figure 14:
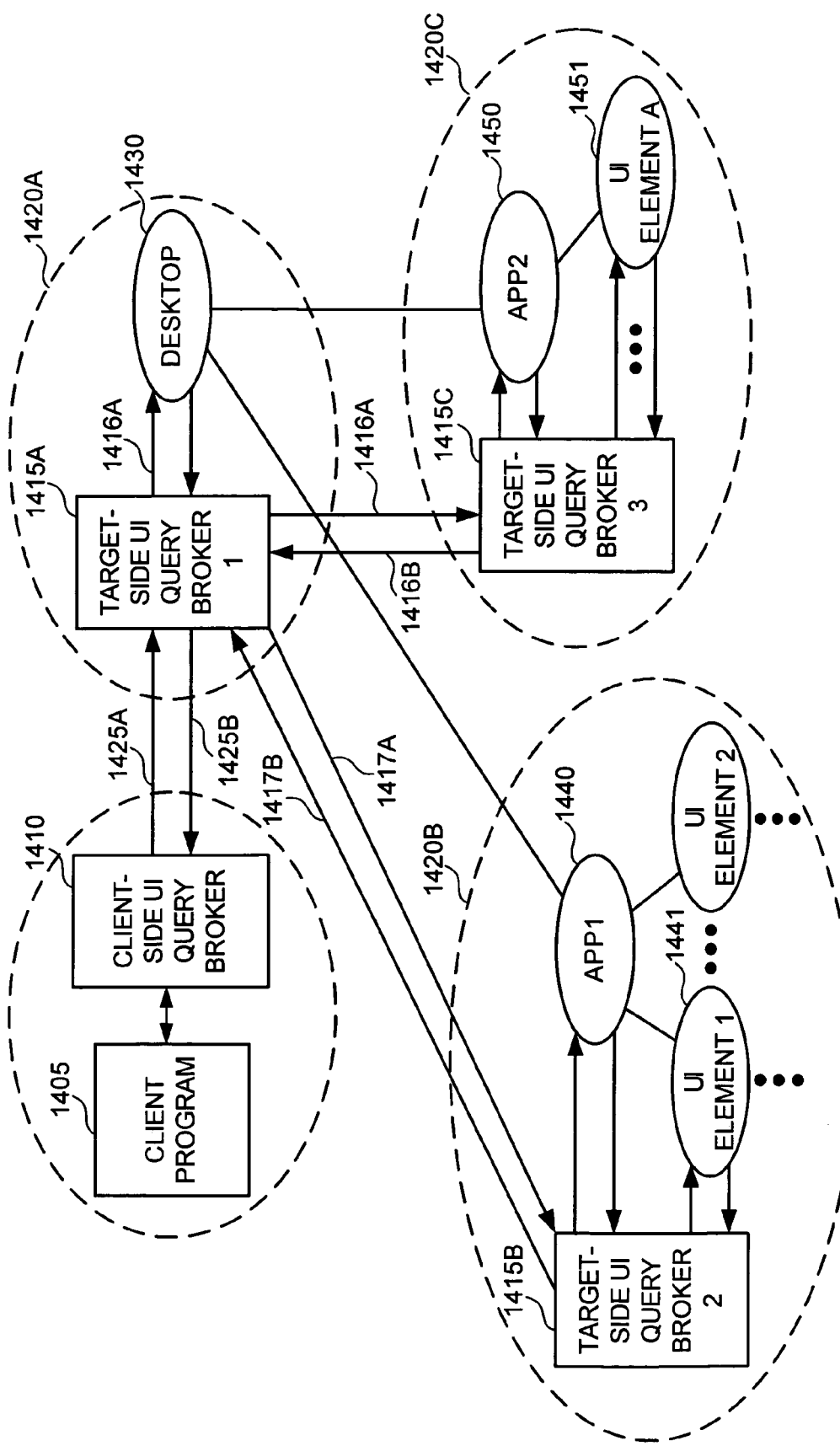
FIG. 14 is a block diagram illustrating an alternative embodiment of a system for brokering user interface information queries, wherein the hierarchy of the target user interface spans multiple processes, and multiple target-side query brokers are invoked for collecting user interface information from elements local to their process.

An Exemplary Method of Brokering UI Element Queries by Target-Side UI Element Query Broker Requiring Visitation of a Plurality of Elements of a UI Element Hierarchy Spanning Multiple Processes The exemplary implementation of FIG. 6 related to a UI information query, wherein the query was directed to a UI element hierarchy that spanned across a single process 631. However, the entire hierarchy 600 as shown in FIG. 6 itself may span across multiple processes (e.g., 631, 660 and 670). Thus, as shown in FIG. 14, an instance of a target-side UI query broker (e.g., 1415A, 1415B, 1415C, etc.) may be invoked within each of the different processes (e.g., 1420A, 1420B, 1420C etc.) so that calls from a target-side UI element query broker addressed directly to the UI elements of the hierarchy (e.g., 1430, 1440, 1441, 1450 etc.) are intra-process calls. Such an implementation reduces the number of calls across process boundaries that are required for traversing the tree structure and requesting and collecting UI information from individual elements of a target UI hierarchy.

Figure 15:
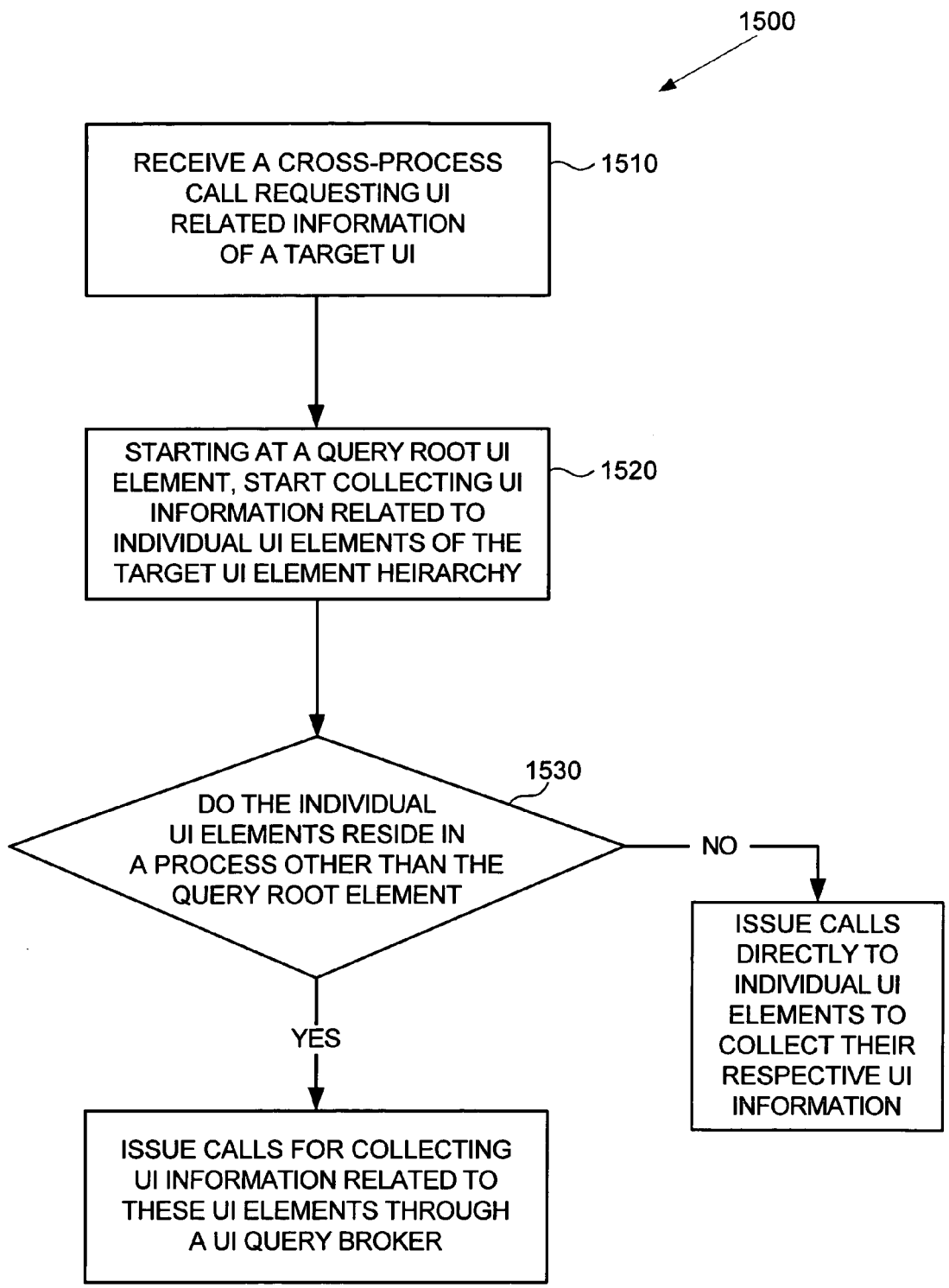
FIG. 15 is a flow diagram illustrating an overall method for collecting user interface information from multiple elements of a target user interface hierarchy, wherein elements of the hierarchy reside in different processes.

FIG. 15 illustrates an exemplary method for responding to a cross-process query, wherein the query requires the traversal of a plurality of elements of a UI hierarchy spanning across multiple process boundaries (e.g., 1420A, 1420B, 1420C etc.). At 1510, a cross-process query from a client-side UI element query broker 1410 is received requesting UI related information from a target UI. The cross-process call may, among other things, specify a root element of the target UI hierarchy at which to begin gathering UI information for completing the query request. At 1520, the target-side UI query broker 1415A residing within the process comprising the target root element may then begin issuing intra-process calls (e.g., 1416A) to gather UI related information requested in the query. The intra-process calls may begin at the root element (e.g., 1430) and proceed further in the hierarchy. However, at 1530 if the next element in the hierarchy resides in a process 1420C other than the root target-side UI query broker 1415A then another instance of a target-side UI query broker 1415C may be invoked, and direct low-level calls to individual UI elements (e.g., 1450, 1451, etc.) may be issued by the local instance of the target-side UI query broker 1415C. Such calls will be local to the process 1420C and in response to a cross-process call 1416A from the original UI element query broker 1415A requesting UI information related to UI elements in the next process 1420C.

The newly invoked target-side UI element query broker 1415C will collect the requested UI information for the appropriate UI elements within its own process boundary 1420C and return the result 1416B. The result 1416B returned can be added to the results 1417B retuned by other target-side UI element query brokers (e.g., 1415B). The collected result may then be processed by the root target-side UI element query broker 1415A and retuned as one result 1425B to the client-side UI element query broker.

This process may be repeated recursively as new process boundaries are crossed and new instances of target-side UI element brokers are invoked within each process boundary to collect and return appropriate UI related information to the target-side UI query broker immediately above in the hierarchy and ultimately back to the root target-side UI element query broker 1415A to be assembled and returned as the result 1425A back to the client-side UI query broker 1410.

Exemplary Advantages

The systems and methods described herein can provide several advantages. In the system shown in FIG. 2, the client 210 may need to make multiple calls (e.g., 215A and 220A) across process boundaries (e.g., 225, 235, and 245) and thus, walk the entire tree visiting each of its elements (e.g., 105A and 110A) in order to learn of its entire structure or encounter a specified UI element. Even operations that involve finding a single UI element that meets client specified conditions may require multiple calls across process boundaries before an UI element meeting all the specified conditions is encountered. These calls are costly and significantly slow the process of UI accessibility between clients and target UI elements residing in different processes.

Figure 2:
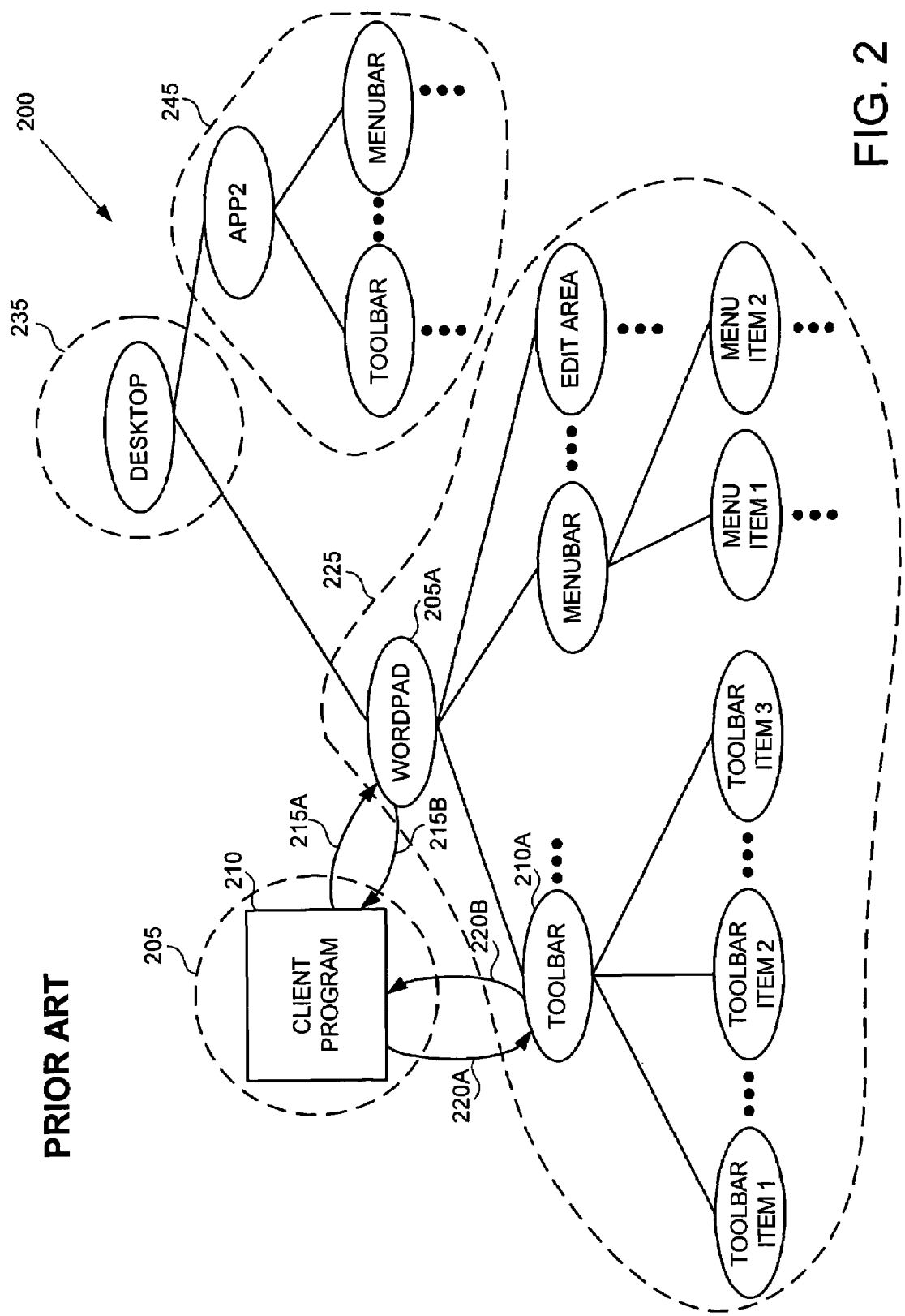
FIG. 2 is a block diagram illustrating a client program interacting with a target user interface for collecting user interface related information from component elements of the target user interface.

For instance, if a client program related to assistive technology attempts to retrieve the items of a list box in another process it may have to make multiple calls across process boundaries before the targeted list box is first found. Furthermore, it may take more calls to discover and access all of the list items related to box, and thus, further adding to the delay. Also, as shown in FIG. 2, such low-level calls across a process (e.g., 215A and 220A) to an individual UI element returns a corresponding result (e.g., 215B and 220B) back to the client 210. This means that the client has to ultimately process the results of a large number of such low-level calls. Regardless of whether the client program and its target UI hierarchy are part of the same process or not, in a scenario involving a large number of UI elements these low level operations can significantly reduce the processing speed of the client program.

However, the improved accessibility model described herein can reduce the cost of interaction between a client program and target UI elements residing in a different process by reducing the number of cross-process calls required for retrieving UI related information. Also, the improved accessibility model described herein can allow a client program to avoid having to traverse the target UI hierarchy using a series of low-level calls by issuing high-level query calls. This particular advantage is useful regardless of whether the calls from the client program to its target UI elements are intra-process or cross-process.

Exemplary Computing Environment

Figure 16:
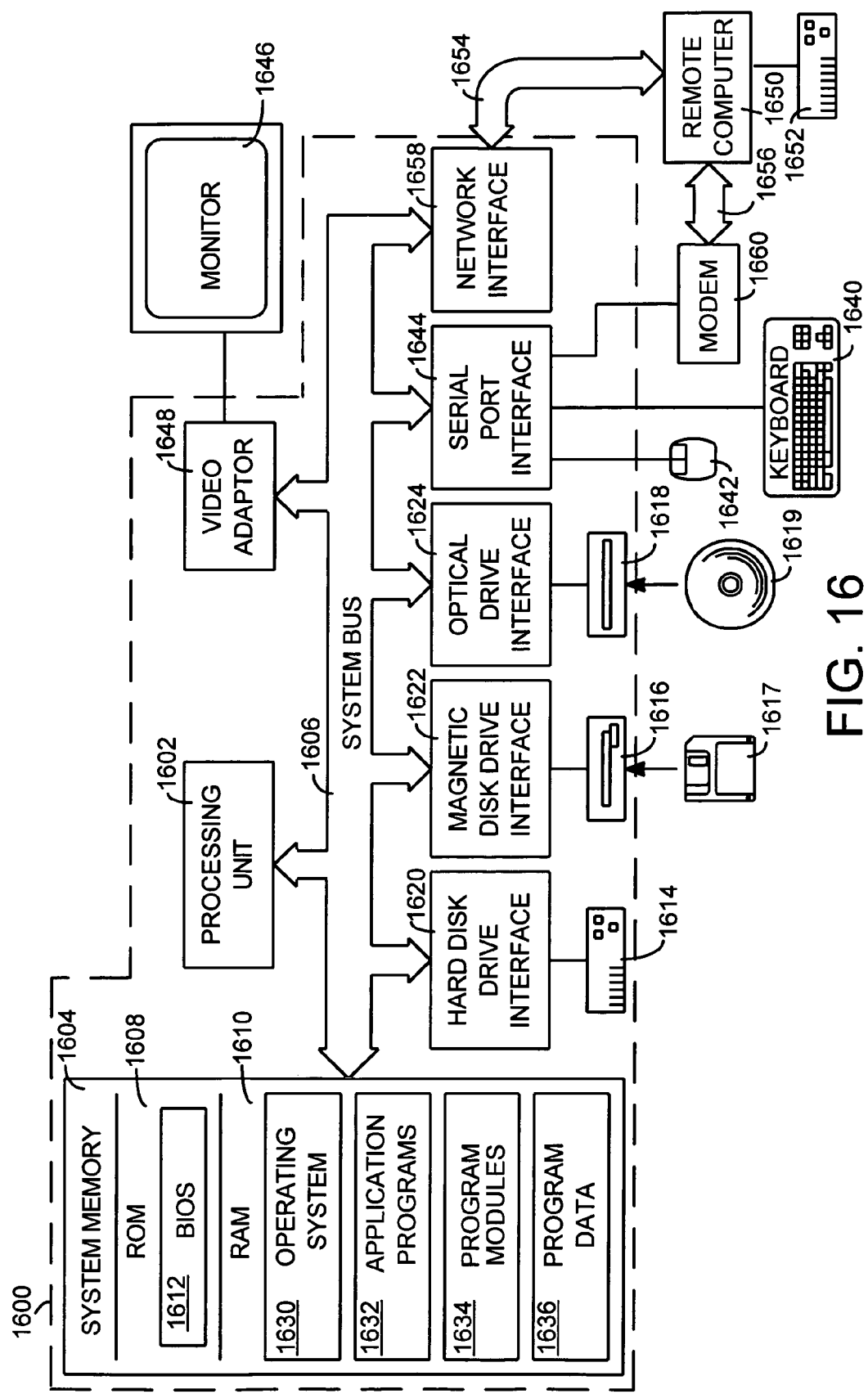
FIG. 16 is a diagram depicting a general-purpose computing device constituting an exemplary system for implementing the disclosed technology.

FIG. 16 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 16, an exemplary system for implementing the disclosed technology includes a general purpose computing device in the form of a conventional PC 1600, including a processing unit 1602, a system memory 1604, and a system bus 1606 that couples various system components including the system memory 1604 to the processing unit 1602. The system bus 1606 may be any of several types of bus structures including a memory bus or memory controller, a peripheral bus, and a local bus using any of a variety of bus architectures. The system memory 1604 includes read only memory (ROM) 1608 and random access memory (RAM) 1610. A basic input/output system (BIOS) 1612, containing the basic routines that help with the transfer of information between elements within the PC 1600, is stored in ROM 1608.

The PC 1600 further includes a hard disk drive 1614 for reading from and writing to a hard disk (not shown), a magnetic disk drive 1616 for reading from or writing to a removable magnetic disk 1617, and an optical disk drive 1618 for reading from or writing to a removable optical disk 1619 (such as a CD-ROM or other optical media). The hard disk drive 1614, magnetic disk drive 1616, and optical disk drive 1618 are connected to the system bus 1606 by a hard disk drive interface 1620, a magnetic disk drive interface 1622, and an optical drive interface 1624, respectively. The drives and their associated computer-readable media provide nonvolatile storage of computer-readable instructions, data structures, program modules, and other data for the PC 1600. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 1617, optical disk 1619, ROM 1608, or RAM 1610, including an operating system 1630, one or more application programs 1632, other program modules 1634, and program data 1636. A user may enter commands and information into the PC 1600 through input devices such as a keyboard 1640 and pointing device 1642 (such as a mouse). Other input devices (not shown) may include a digital camera, microphone, joystick, game pad, satellite dish, scanner, or the like. These and other input devices are often connected to the processing unit 1602 through a serial port interface 1644 that is coupled to the system bus 1606, but may be connected by other interfaces such as a parallel port, game port, or universal serial bus (USB). A monitor 1646 or other type of display device is also connected to the system bus 1606 via an interface, such as a video adapter 1648. Other peripheral output devices, such as speakers and printers (not shown), may be included.

The PC 1600 may operate in a networked environment using logical connections to one or more remote computers, such as a remote computer 1650. The remote computer 1650 may be another PC, a server, a router, a network PC, or a peer device or other common network node, and typically includes many or all of the elements described above relative to the PC 1600, although only a memory storage device 1652 has been illustrated in FIG. 16. The logical connections depicted in FIG. 16 include a local area network (LAN) 1654 and a wide area network (WAN) 1656. Such networking environments are commonplace in offices, enterprise-wide computer networks, intranets, and the Internet.

When used in a LAN networking environment, the PC 1600 is connected to the LAN 1654 through a network interface 1658. When used in a WAN networking environment, the PC 1600 typically includes a modem 1660 or other means for establishing communications over the WAN 1656, such as the Internet. The modem 1660, which may be internal or external, is connected to the system bus 1606 via the serial port interface 1644. In a networked environment, program modules depicted relative to the personal computer 1600, or portions thereof, may be stored in the remote memory storage device. The network connections shown are exemplary, and other means of establishing a communications link between the computers may be used.

Alternatives

Having described and illustrated the principles of our invention with reference to the illustrated embodiments, it will be recognized that the illustrated embodiments can be modified in arrangement and detail without departing from such principles. For instance, while some of the examples described herein, describe cross-process calls, any of such examples can use intra-process calls instead. Also, parameters of a query requesting UI information, whether it be intra-process or cross-process, may comprise a root element in a target UI element hierarchy at which to begin collecting UI information, a maximum depth in the target hierarchy within which to conduct the query, a maximum width property, one or more conditions for determining elements of the UI hierarchy to be visited for collecting UI information, or some combination thereof.

Furthermore, in any of the examples described herein, results returned for the queries (e.g., intra-process, cross-process etc.) seeking UI related information may comprise the first element of a target user interface hierarchy meeting one or more conditions, all elements of the target user interface hierarchy meeting one or more conditions, selected properties of selected elements of the target user interface hierarchy, a tree structure representation of the hierarchical relationships between various elements of the target user interface hierarchy, or some combination thereof.

Also, it should be understood that although many of the examples have been described with reference to UI elements of a typical Microsoft® Windows UI platform, the principles illustrated in the examples are not limited by the type of UI or the platform associated therewith. In fact, the principles illustrated with examples above may be applied to UI elements from many other UI platforms (e.g., Apple® Macintosh® System X, Swing® for the Java® language, GNOME, etc.).

Furthermore, it should be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media (e.g., Compact Disk, Floppy Disk, Hard Disk, Memory etc.), comprising computer-executable instructions for performing such actions. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

I claim:

1. At least one computer-readable medium having stored thereon computer-executable instructions for performing a method of processing a query requesting user interface information related to a target user interface hierarchy comprising a plurality of user interface elements in a second process, the method comprising:
   with a first query broker associated with a first process, creating a query, the creating comprising:
      1) specifying a type of result to be returned in response to the query, and
      2) specifying query parameters for determining the plurality of elements of the target user interface hierarchy whose user interface information is to be examined for collecting the specified type of query result;
   with the first query broker, directing the query to a second query broker associated with the target user interface hierarchy using a single cross-process call;
   with the first query broker, receiving results of the query from the second query broker, the results returned in a single cross-process call; and
   with the first process, programmatically accessing at least one of the plurality of user interface elements of the second process using at least a portion of the results of the query.

2. The computer-readable medium of claim 1, wherein the query parameters comprises one or more selected from the group consisting of:
   a datum indicative of a root element of the target user interface hierarchy at which to begin collecting user interface information of individual elements of the target user interface hierarchy;
   a datum indicative of a range of elements of the target user interface hierarchy; and
   one or more conditions for selecting elements of the target user interface hierarchy.

3. The computer-readable medium of claim 1, wherein the results comprise a data structure indicative of hierarchical relationships of the elements of the target user interface hierarchy.

4. The computer-readable medium of claim 1, wherein the results comprise an array form data structure indicating values of properties of one or more elements of the target user interface hierarchy.

5. The computer-readable medium of claim 1, wherein the query parameters comprise maximum depth of a depth first search to be performed.

6. A system for brokering queries from a client program across a process boundary, the queries requesting graphical user interface information related to a target user interface hierarchy, wherein the target user interface hierarchy comprises a plurality of graphical user interface elements in a target program, the system comprising:
   a client-side user interface query broker associated with the client program operable for generating a cross-process query based on query parameters provided by a the client program, and operable for passing the cross-process query as a single cross-process call to a target-side user interface query broker;
   the target-side user interface query broker operable for responding to the cross-process query by issuing a plurality of calls for requesting user interface information of individual elements of the target user interface hierarchy, and assembling the retrieved user interface information of the individual elements of the target user interface hierarchy for returning the assembled user interface information as results of the cross-process query in a single cross-process call to the client-side user interface query broker; and
   the client program using at least a portion of the results of the cross-process query to programmatically access at least a portion of the graphical user interface elements comprising the target user interface hierarchy in the target program.

7. The system of claim 6, wherein the target-side user interface query broker comprises a code module operable for linking to a process also comprising one or more individual elements of the target user interface hierarchy.

8. The system of claim 6, wherein the query parameters provided by the client program comprises one or more selected from the group consisting of:
   datum indicative of a root element of the target user interface hierarchy at which to begin assembling user interface information of the individual elements of the target user interface hierarchy;
   datum indicative of a range of elements of the target user interface hierarchy from which to assemble user interface information of the individual elements of the target user interface hierarchy; and
   one or more conditions for selecting elements of the target user interface hierarchy whose user interface information is assembled as results of the cross-process query.

9. The system of claim 6, further comprising a target-side user interface query broker associated with each process other than a process comprising a root element of the target user interface hierarchy.

10. The system of claim 6, wherein the results of the cross-process query comprises one more selected from the group consisting of:
   datum indicating a first element of the target user interface hierarchy that meets one or more conditions of the cross-process query;

datum indicating a set of all elements of the target user interface hierarchy that meets one more conditions of the cross-process query;

datum indicating values of selected properties of one or more elements of the target user interface hierarchy; and datum indicating hierarchical relationships between selected elements of the target user interface hierarchy.

11. A method for providing user interface information related to a target user interface hierarchy associated with one or more computer programs, wherein the target user interface hierarchy comprises a plurality of graphical user interface elements used within a first process within at least one of the one or more computer programs, the method comprising:

issuing a query requesting graphical user interface information of the target user interface hierarchy as a single call across at least one process boundary using a client side query broker;

receiving the query at a target side query broker in a second process;

responsive to receiving the query, with the target side query broker, traversing a plurality of the graphical user interface elements of the target user interface hierarchy via a plurality of programmatic calls issued to the graphical user interface elements of the target user interface hierarchy, wherein the traversing collects user interface information from the plurality of the graphical user interface elements of the target user interface hierarchy according to parameters specified in the query;

based on the user interface information collected during the traversing, with the target side query broker, returning results of the query as a single call across the at least one process boundary to the client-side query broker; and with the at least one of the one or more computer programs, using the results of the query to programmatically access at least one of the plurality of graphical user interface elements of the target user interface hierarchy.

12. The method of claim 11, wherein the target user interface hierarchy spans across a plurality of processes and the programmatic calls issued to the graphical user interface elements of the target user interface hierarchy comprise one or more cross-process queries.

13. The method of claim 11, wherein:
the query is received as a query object;
parameters of the query are received as properties of the query object; and
the user interface information is requested by calling a method associated with the query object.

14. The method of claim 11, wherein the query parameters comprise a root element of the target user interface hierarchy at which to begin collecting the user interface information.

15. The method of claim 11, wherein the query parameters comprise conditions for selecting elements of the target user interface hierarchy whose user interface information is included in the results of the query.

16. The method of claim 11, wherein the query parameters comprise datum for indicating a range of the target user interface element hierarchy to traverse in order to collect user interface information to be returned as results of the cross-process query.

17. The method of claim 11, wherein the query specifies a result-type requesting a first element meeting one or more conditions; and the results of the query comprise a reference for identifying the first element of the target user interface hierarchy meeting the one or more conditions specified in the query.

18. The method of claim 11, wherein the query specifies a result-type requesting all elements meeting one or more conditions; and the results of the query comprise references for indicating all elements of the target user interface hierarchy meeting the one or more conditions specified in the query.

19. The method of claim 11, wherein the query specifies a result-type requesting hierarchical relationships between various elements of the target user interface hierarchy; and the results of the query comprise a tree structure representation of the hierarchical relationships between the various elements of the target user interface hierarchy.

20. The method of claim 19, wherein a client program issues the query requesting graphical user interface information of the target user interface hierarchy, and wherein, using the results of the query, the client program reconstructs a representation of the target user interface hierarchy in local client memory.

21. The method of claim 20, wherein the client program traverses the representation of the target user interface hierarchy in the local client memory.

22. One or more computer-readable media comprising computer-executable instructions for performing the method of claim 11.

23. The method of claim 11, wherein at least one of the plurality of the graphical user elements of the target user interface hierarchy is in a third process and wherein the target side query broker issues a query requesting graphical user interface information of the graphical user interface element in the third process as a single call from the target side query broker in the second process to a separate query broker in the third process.

* * * * *